United States Patent
Kamikado et al.

(10) Patent No.: US 7,950,750 B2
(45) Date of Patent: May 31, 2011

(54) APPARATUS AND METHOD FOR MAINTAINING BRAKING FORCE OF VEHICLE

(75) Inventors: Masaru Kamikado, Kariya (JP); Gen Inoue, Susono (JP)

(73) Assignees: Advics Co., Ltd., Kariya, Aichi-pref. (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1231 days.

(21) Appl. No.: 11/583,814

(22) Filed: Oct. 20, 2006

(65) Prior Publication Data

US 2007/0090692 A1    Apr. 26, 2007

(30) Foreign Application Priority Data

Oct. 20, 2005  (JP) .................... 2005-305742

(51) Int. Cl.
    *B60T 8/1755*  (2006.01)
(52) U.S. Cl. ........................................ 303/191
(58) Field of Classification Search .......... 303/140, 303/146, 191, 192, 157
    See application file for complete search history.

(56) References Cited

U.S. PATENT DOCUMENTS

| 5,733,019 | A | 3/1998 | Inagaki et al. | |
| 6,428,120 | B1 * | 8/2002 | Holl | 303/191 |
| 7,641,291 | B2 * | 1/2010 | Streit et al. | 303/191 |
| 2001/0038242 | A1 | 11/2001 | Soejima et al. | |
| 2003/0227215 | A1 * | 12/2003 | Kinder et al. | 303/3 |
| 2003/0227217 | A1 | 12/2003 | Yoshizawa et al. | |
| 2007/0164608 | A1 | 7/2007 | Streit et al. | |

FOREIGN PATENT DOCUMENTS

| JP | 59-179439 | A | 10/1984 |
| JP | 7-315197 | A | 12/1995 |
| JP | 8-332937 | A | 12/1996 |
| JP | 2001-310724 | A | 11/2001 |
| JP | 2002-079925 | A | 3/2002 |
| JP | 2004-9892 | A | 1/2004 |
| JP | 2006-528579 | A | 12/2006 |
| WO | WO 2004/103785 | A1 * | 12/2004 |

OTHER PUBLICATIONS

Office Action issued Jul. 13, 2010 by the Japanese Patent Office in Japanese Patent Application No. 2005-305742.

* cited by examiner

*Primary Examiner* — Robert A Siconolfi
*Assistant Examiner* — Vu Q Nguyen
(74) *Attorney, Agent, or Firm* — Buchanan Ingersoll & Rooney PC

(57) ABSTRACT

A braking force maintaining apparatus executes hill-hold control in which braking force applied to each of wheels of a vehicle is maintained by a braking device even after release of a brake pedal. An electronic control unit determines whether the yaw rate of the vehicle is greater than or equal to a predetermined threshold value and whether the wheels are held in a locked state by the braking force applied by the braking device. If the wheels are held in the locked state and the yaw rate is greater than or equal to the threshold value, the electronic control unit controls the braking device in such a manner that the braking force acting on two or more of wheels including at least a specific wheel falls below the braking force at the start of the hill-hold control. The specific wheel is one of steered wheels that corresponds to an outer wheel when the steered wheels are steered through manipulation of the steering wheel intended to correct an offset posture of the vehicle that causes generation of the yaw rate.

8 Claims, 8 Drawing Sheets

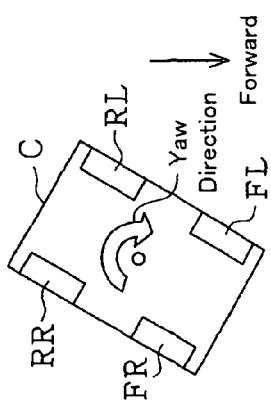
Fig. 7A
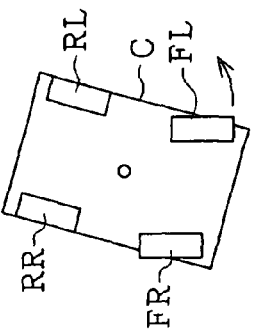
Fig. 7B
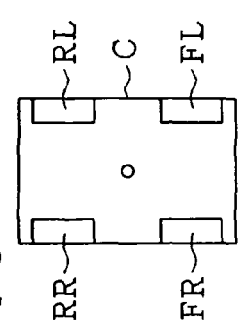
Fig. 7C
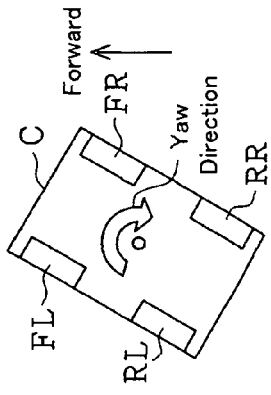
Fig. 6A
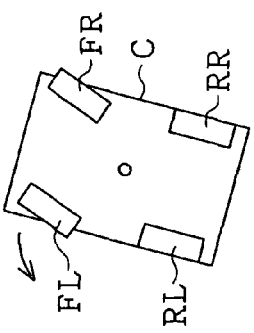
Fig. 6B
Fig. 6C
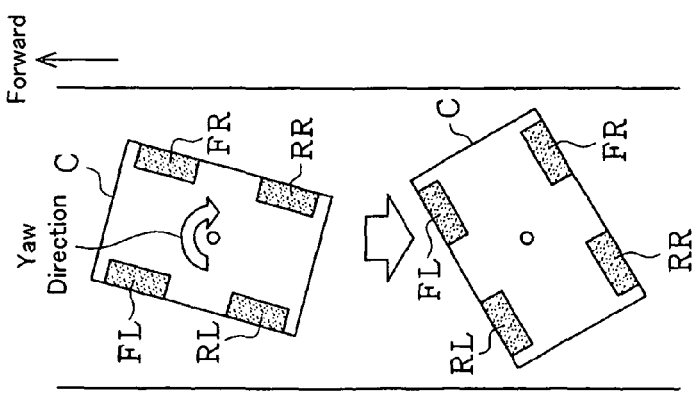
Fig. 5A
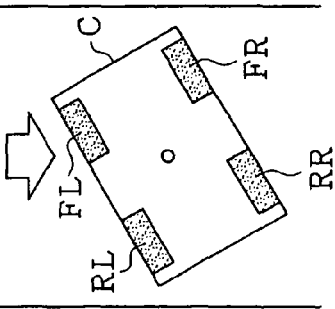
Fig. 5B

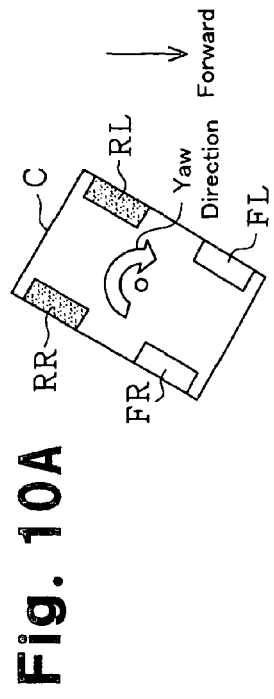
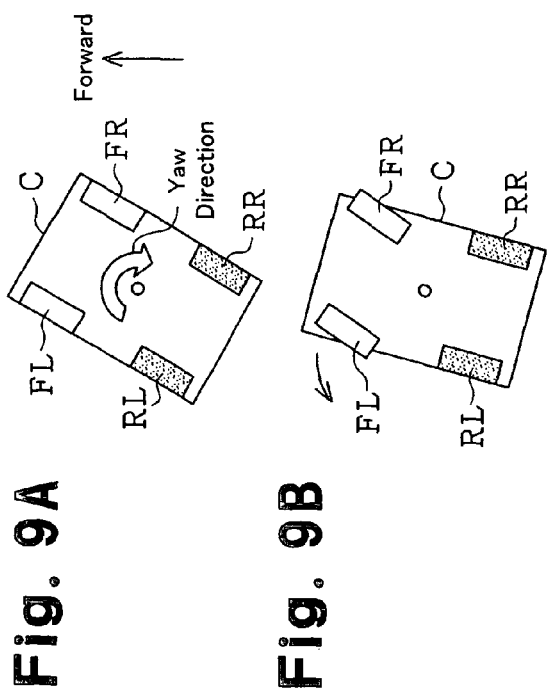

APPARATUS AND METHOD FOR MAINTAINING BRAKING FORCE OF VEHICLE

CROSS-REFERENCE TO RELATED APPLICATION

This application is based upon and claims the benefit of priority from prior Japanese Patent Application No. 2005-305742, filed on Oct. 20, 2005, the entire contents of which are incorporated herein by reference.

BACKGROUND OF THE INVENTION

The present invention relates to an apparatus and a method for maintaining braking force acting on the wheels of a vehicle that has been stopped through depression of a brake pedal even after the brake pedal is released from depression.

Generally, if the brake pedal of a vehicle is released from depression when the vehicle is stopped on an inclined surface such as a slope, braking force acting on each of the wheels quickly drops, causing undesired downward movement (sliding) of the vehicle along the inclined surface. This may prevent the driver from smoothly re-starting the vehicle. To avoid this, an apparatus and a method for maintaining braking force of a vehicle involving hill-hold control have been proposed (as described in, for example, Japanese Laid-Open Patent Publication No. 59-179439). Through the hill-hold control, undesired movement of the vehicle is suppressed by maintaining braking force acting on the wheels of a stopped vehicle even after the brake pedal is released from depression.

Specifically, even if the brake pedal is released after the vehicle has been stopped through depression of the brake pedal, the wheels of the vehicle are maintained in a locked state through the hill-hold control by the braking force maintaining apparatus of Japanese Laid-Open Patent Publication No. 59-179439. Through such control, unintended movement of the vehicle is prevented from occurring even when the brake pedal is released in a state in which the vehicle is held in a stopped state on the inclined surface, such as a slope surface, through depression of the brake pedal. The hill-hold control is ended when the accelerator pedal is depressed for re-starting the vehicle.

Further, if the surface on which the vehicle is stopped exhibits low friction coefficient μ (as in the case of a surface covered with snow) and is inclined exceeding a certain level, the vehicle may move in an unintended manner, causing yaw of the vehicle. In this case, if the vehicle does not have the braking force maintaining apparatus executing the hill-hold control, the wheels of the vehicle can be unlocked by releasing the brake pedal. This permits the driver of the vehicle to manipulate the steering wheel for correcting the posture of the vehicle.

However, if the vehicle has the braking force maintaining apparatus of Japanese Laid-Open Patent Publication No. 59-179439, which executes the hill-hold control, the wheels of the vehicle are held in a locked state even after release of the brake pedal intended to correct the posture of the vehicle. In this state, the wheels cannot grip the ground surface. In other words, as long as the wheels are held in the locked state, the posture of the vehicle cannot be corrected by manipulation of the steering wheel, complicating operation of the driver.

SUMMARY OF THE INVENTION

Accordingly, it is an objective of the present invention to provide an apparatus and a method for maintaining braking force of a vehicle by which, if yaw of the vehicle is caused by unintended movement of the vehicle in hill-hold control in which the wheels of the vehicle are maintained in a locked state, correction of the posture of the vehicle is assisted.

To achieve the foregoing objective and in accordance with one aspect of the present invention, a braking force maintaining apparatus of a vehicle is provided. The vehicle includes a braking device that applies a braking force to each of wheels of the vehicle through depression of a brake pedal. The wheels include a left steered wheel and a right steered wheel that are steered through manipulation of a steering wheel. The apparatus executes hill-hold control in which the braking force acting on each wheel of the vehicle in a stopped state through the depression of the brake pedal is maintained by the braking device even after release of the brake pedal. The apparatus includes a yaw rate detecting device, a yaw rate determining section, a wheel lock determining section, and a control section. The yaw rate detecting device detects a yaw rate of the vehicle. The yaw rate determining section determines whether the yaw rate detected by the yaw rate detecting device is greater than or equal to a predetermined threshold value. The wheel lock determining section determines whether the wheels are held in a locked state by the braking force applied by the braking device. The control section controls the braking device in such a manner that, if determination of the wheel lock determining section is positive and determination of the yaw rate determining section is positive, the braking force acting on two or more of the wheels including at least a specific wheel falls below the braking force at the start of the hill-hold control. The specific wheel is one of the steered wheels that corresponds to an outer wheel when the steered wheels are steered through the manipulation of the steering wheel intended to correct an offset posture of the vehicle that causes generation of the yaw rate.

In accordance with another aspect of the present invention, a method for maintaining braking force of a vehicle is provided. The method includes: applying a braking force to each of wheels of the vehicle by a braking device through depression of a brake pedal, the wheels including a left steered wheel and a right steered wheel that are steered through manipulation of a steering wheel; executing hill-hold control in which the braking force acting on each of the wheels of the vehicle held in a stopped state through the depression of the brake pedal is maintained by the braking device even after release of the brake pedal; detecting a yaw rate of the vehicle; determining whether the detected yaw rate is greater than or equal to a predetermined threshold value; determining whether the wheels are held in a locked state by the braking force applied by the braking device; and controlling the braking device in such a manner that, if the wheels are held in the locked state and the detected yaw rate is greater than or equal to the threshold value, the braking force acting on two or more of the wheels including at least a specific wheel falls below the braking force at the start of the hill-hold control, the specific wheel being one of the steered wheels that corresponds to an outer wheel when the steered wheels are steered through the manipulation of the steering wheel intended to correct an offset posture of the vehicle that causes generation of the yaw rate.

BRIEF DESCRIPTION OF THE DRAWINGS

FIG. 5A is a diagrammatic view showing a state of yaw of a vehicle at an early stage;

FIG. 5B is a diagrammatic view showing a state of the vehicle in yaw;

FIG. 6A is a diagrammatic view showing a state of the vehicle in the yaw avoiding procedure of the first embodiment executed following rearward movement of the vehicle;

FIG. 6B is a diagrammatic view showing a state of the vehicle where the front wheels are steered;

FIG. 6C is a diagrammatic view showing a state of the vehicle after the posture of the vehicle has been corrected;

FIG. 7A is a diagrammatic view showing a state of the vehicle in the yaw avoiding procedure of the first embodiment executed following forward movement of the vehicle;

FIG. 7B is a diagrammatic view showing a state of the vehicle where the front wheels are steered;

FIG. 7C is a diagrammatic view showing a state of the vehicle after the posture of the vehicle has been corrected;

FIG. 9A is a diagrammatic view showing a state of the vehicle in a first yaw avoiding procedure of the second embodiment executed following rearward movement of the vehicle;

FIG. 9B is a diagrammatic view showing a state of the vehicle where the front wheels are steered;

FIG. 9C is a diagrammatic view showing a state of the vehicle after the posture of the vehicle has been corrected;

FIG. 9D is a diagrammatic view showing a state of the vehicle in a second yaw avoiding procedure;

FIG. 10A is a diagrammatic view showing a state of the vehicle in the first yaw avoiding procedure of the second embodiment executed following forward movement of the vehicle;

FIG. 10B is a diagrammatic view showing a state of the vehicle where the front wheels are steered;

FIG. 10C is a diagrammatic view showing a state of the vehicle after the posture of the vehicle has been corrected;

FIG. 10D is diagrammatic view showing a state of the vehicle in the second yaw avoiding procedure;

DETAILED DESCRIPTION OF THE PREFERRED EMBODIMENTS

A first embodiment of the present invention will now be described with reference to FIGS. 1 to 7C. Hereafter, the advancing direction of a vehicle is referred to as a forward direction of the vehicle. Also, unless otherwise specified, a lateral direction coincides with the lateral direction with respect to the vehicle advancing direction.

Figure 1:
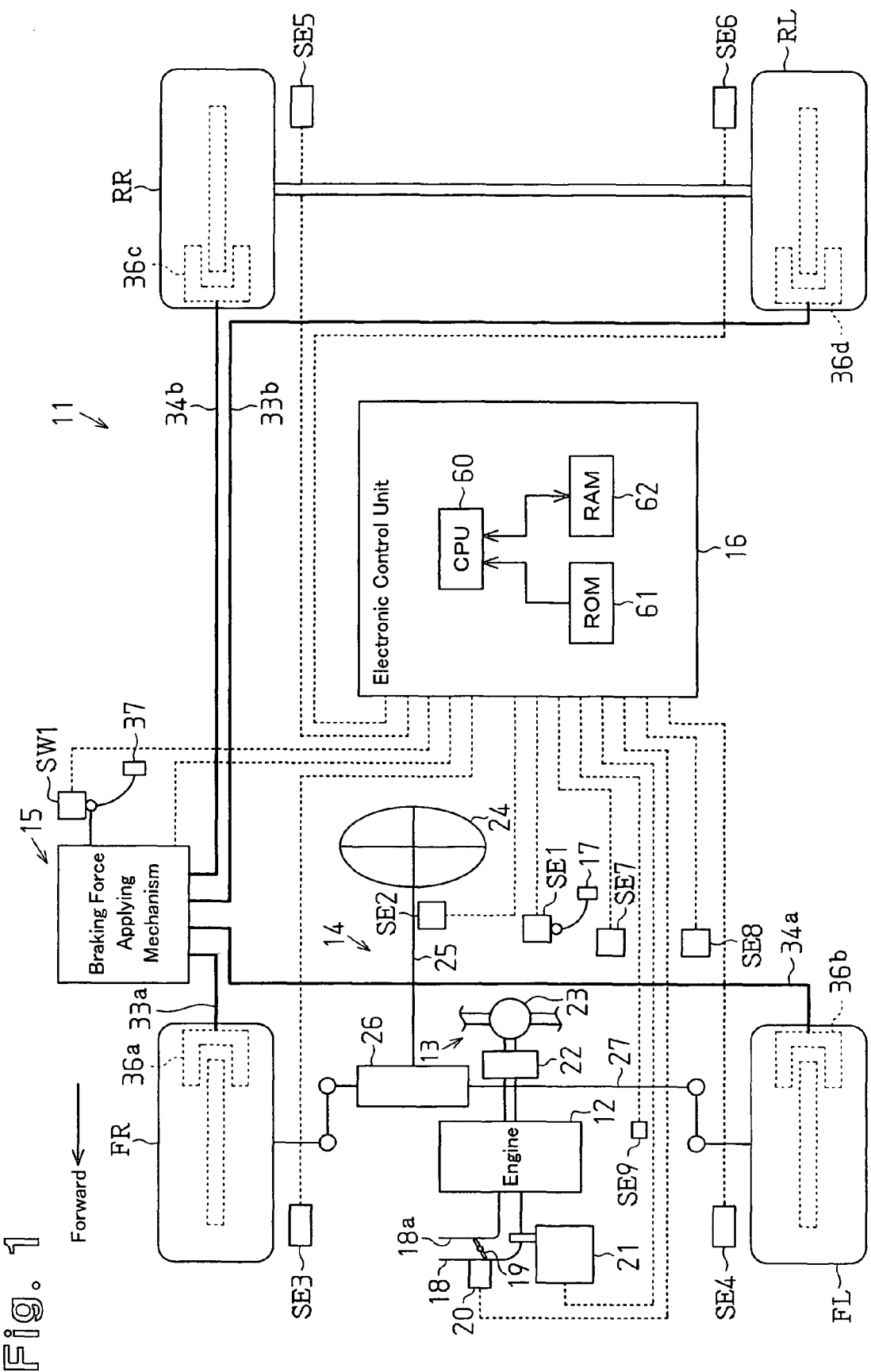
FIG. 1 is a block diagram representing a braking force maintaining apparatus according to a first embodiment of the present invention.

As illustrated in FIG. 1, a braking force maintaining apparatus 11 of a vehicle of the illustrated embodiment is provided in a front-wheel-drive vehicle. Specifically, the vehicle has a plurality of wheels (in the illustrated embodiment, four wheels, or a right front wheel FR, a left front wheel LF, a right rear wheel RR, and left rear wheel RL). The front wheels FR, FL function as the drive wheels of the vehicle. The braking force maintaining apparatus 11 has a power transmission mechanism 13, a front wheel steering mechanism 14, and a braking force applying mechanism 15. The power transmission mechanism 13 transmits power of an engine 12, or a drive source, to the front wheels FR, FL. The front wheel steering mechanism 14 operates to steer the front wheels FR, FL as steered wheels. The braking force applying mechanism 15 applies braking force to the wheels FR, FL, RR, RL. The braking force maintaining apparatus 11 also includes an electronic control unit (referred to as "ECU") 16 that controls operation of the mechanisms 13, 14, 15 in correspondence with a traveling state of the vehicle. The engine 12 generates power in correspondence with depression of an accelerator pedal 17 by the driver of the vehicle.

The power transmission mechanism 13 has a throttle valve actuator 20 (for example, a DC motor) and a fuel injection device 21. The throttle valve actuator 20 adjusts the opening degree of a throttle valve 19, which changes the communication area of an intake passage 18a of an intake pipe 18. The fuel injection device 21 has injectors injecting fuel into areas in the vicinity of intake ports (not shown) of the engine 12. The power transmission mechanism 13 also has a transmission 22 and a differential gear 23. The transmission 22 is connected to the output shaft of the engine 12. The differential gear 23 appropriately distributes the power, which has been transmitted by the transmission 22, to the front wheels FL, FR. An accelerator opening degree sensor SE1 is also provided in the power transmission mechanism 13 and detects the amount of depression of the accelerator pedal 17.

The front wheel steering mechanism 14 has a steering wheel 24, a steering shaft 25 to which the steering wheel 24 is fixed, and a steering actuator 26 connected to the steering shaft 25. The front wheel steering mechanism 14 also includes a link mechanism 27 having tie rods and a link. The tie rod is moved by the steering actuator 26 in the lateral direction of the vehicle. This causes the link of the link mechanism 27 to steer the front wheels FL, FR. A steering angle sensor SE2 is provided in the front wheel steering mechanism 14 and detects the steering angle of the steering wheel 24.

The braking force applying mechanism 15 will hereafter be explained with reference to FIG. 2.

Figure 2:
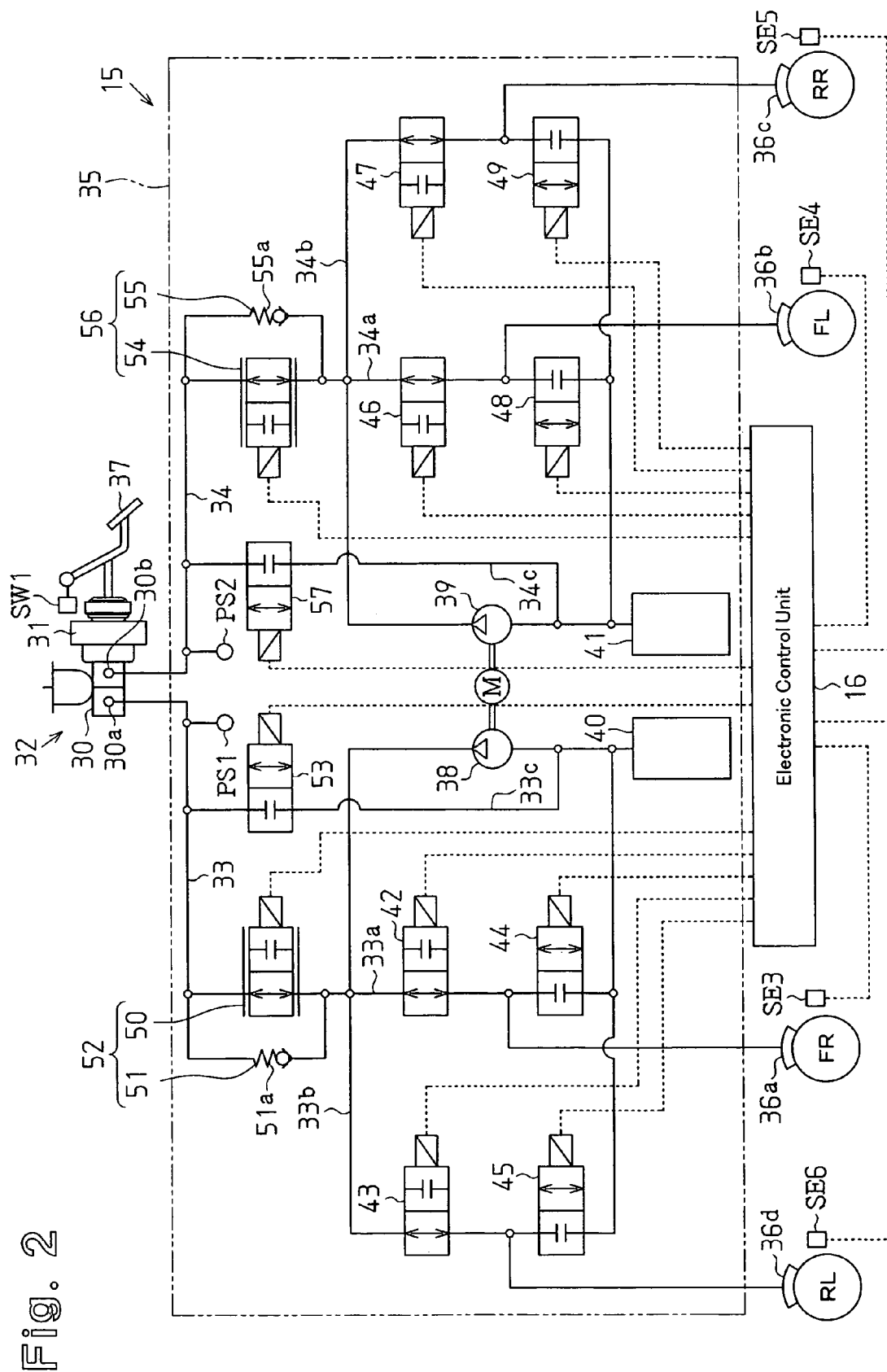
FIG. 2 is a block diagram representing a braking force applying mechanism of the first embodiment.

As illustrated in FIG. 2, the braking force applying mechanism 15 has a fluid pressure generating device 32 including a master cylinder 30 and a booster 31, and a fluid pressure control section 35 (indicated by the alternate long and two short dashes line of FIG. 2) including two hydraulic circuits 33, 34. The hydraulic circuits 33, 34 are each connected to the fluid pressure generating device 32. The first hydraulic circuit 33 is connected to wheel cylinders (braking device) 36a, 36d. The second hydraulic circuit 34 is connected to wheel cylinders (braking device) 36b, 36c. The wheel cylinders 36a to 36d are provided in correspondence with the wheels FR, FL, RR, RL. Specifically, the wheel cylinder 36a corresponds to the right front wheel FR and the wheel cylinder 36b corresponds to the left front wheel FL. The wheel cylinder 36c corresponds to the right rear wheel RR and the wheel cylinder 36d corresponds to the left rear wheel RL.

The fluid pressure generating device 32 includes a brake pedal 37. When the brake pedal 37 is depressed by the driver, the master cylinder 30 and the booster 31 of the fluid pressure generating device 32 are activated. The master cylinder 30 has two output ports 30a, 30b. The output port 30a is connected to the first hydraulic circuit 33, and the output port 30b is connected to the second hydraulic circuit 34. Further, the fluid pressure generating device 32 includes a brake switch SW1, which sends a signal to the electronic control unit 16 when the brake pedal 37 is depressed.

The fluid pressure control section 35 includes a pump 38 for increasing the brake fluid pressure in the first hydraulic circuit 33, a pump 39 for increasing the brake fluid pressure in the second hydraulic circuit 34, and a motor M for simultaneously driving the pumps 38, 39. Reservoirs 40, 41 for storing brake fluid are provided on the hydraulic circuits 33, 34, respectively. Brake fluid in the reservoirs 40, 41 is supplied to the hydraulic circuits 33, 34 in response to the activation of the pumps 38, 39. Further, the hydraulic circuits 33, 34 have fluid pressure sensors PS1, PS2 for detecting the brake fluid pressure in the master cylinder 30, respectively.

The first hydraulic circuit 33 has a right front wheel path 33a and a left rear wheel path 33b. The right front wheel path 33a is connected to the wheel cylinder 36a corresponding to the right front wheel FR. The left rear wheel path 33b is connected to the wheel cylinder 36d corresponding to the left rear wheel RL. A normally open electromagnetic valve 42 and a normally closed electromagnetic valve 44 are provided on the right front wheel path 33a. A normally open electromagnetic valve 43 and a normally closed electromagnetic valve 45 are provided on the left rear wheel path 33b.

Likewise, the second hydraulic circuit 34 has a left front wheel path 34a and a right rear wheel path 34b. The left front wheel path 34a is connected to the wheel cylinder 36b corresponding to the left front wheel FL. The right rear wheel path 34b is connected to the wheel cylinder 36c corresponding to the right rear wheel RR. A normally open electromagnetic valve 46 and a normally closed electromagnetic valve 48 are provided on the left front wheel path 34a. A normally open electromagnetic valve 47 and a normally closed electromagnetic valve 49 are provided on the right rear wheel path 34b.

A normally open proportional electromagnetic valve 50 and a relief valve 51 parallel to the proportional electromagnetic valve 50 are provided in a section of the first hydraulic circuit 33 that is closer to the master cylinder 30 than the branched portion of the paths 33a, 33b. The proportional electromagnetic valve 50 and the relief valve 51 form a proportional differential pressure valve 52. In response to control by the electronic control unit 16, the proportional differential pressure valve 52 generates a fluid pressure difference (difference of the brake fluid pressure) between a section of the first hydraulic circuit 33 closer to the master cylinder 30 than the proportional differential pressure valve 52 and a section of the first hydraulic circuit 33 closer to the wheel cylinders 36a, 36d than the proportional differential pressure valve 52. The maximum value of the fluid pressure difference is determined based on the urging force of a spring 51a of the relief valve 51. The first hydraulic circuit 33 includes a branch hydraulic circuit 33c, which is branched from a section between the reservoir 40 and the pump 38 toward the master cylinder 30. A normally closed electromagnetic valve 53 is provided in the branch hydraulic circuit 33c.

A normally open proportional electromagnetic valve 54 and a relief valve 55 parallel to the proportional electromagnetic valve 54 are provided in a section of the second hydraulic circuit 34 that is closer to the master cylinder 30 than the branched portion of the paths 34a, 34b. The proportional electromagnetic valve 54 and the relief valve 55 form a proportional differential pressure valve 56. In response to control by the electronic control unit 16, the proportional differential pressure valve 56 generates a fluid pressure difference (difference of the brake fluid pressure) between a section of the second hydraulic circuit 34 closer to the master cylinder 30 than the proportional differential pressure valve 56 and a section of the second hydraulic circuit 34 closer to the wheel cylinders 36b, 36c than the proportional differential pressure valve 52. The maximum value of the fluid pressure difference is determined based on the urging force of a spring 55a of the relief valve 55. The second hydraulic circuit 34 includes a branch hydraulic circuit 34c, which is branched from a section between the reservoir 41 and the pump 39 toward the master cylinder 30. A normally closed electromagnetic valve 57 is provided in the branch hydraulic circuit 34c.

Changes in the brake fluid pressure in each of the wheel cylinders 36a to 36d will now be described in cases where the solenoid coils of the electromagnetic valves 42 to 49 are energized and de-energized. In the following description, the proportional electromagnetic valves 50, 54 are assumed to be closed, and the electromagnetic valves 53, 57 in the branch hydraulic circuits 33c, 34c are assumed to be closed.

When all the solenoid coils of the electromagnetic valves 42 to 49 are de-energized, the normally open electromagnetic valves 42, 43, 46, 47 remain open, and the normally closed electromagnetic valves 44, 45, 48, 49 remain closed. Therefore, while the pumps 38, 39 are operating, the brake fluid in the reservoirs 40, 41 flows to the wheel cylinders 36a to 36d through the paths 33a, 33b, 34a, 34b, so that the brake fluid pressure in the wheel cylinders 36a to 36d is increased.

On the other hand, when all the solenoid coils of the electromagnetic. valves 42 to 49 are energized, the normally open electromagnetic valves 42, 43, 46, 47 are closed, and the normally closed electromagnetic valves 44, 45, 48, 49 are opened. Therefore, the brake fluid flows from the wheel cylinders 36a to 36d to the reservoirs 40, 41 through the paths 33a, 33b, 34a, 34b, so that the brake fluid pressure in the wheel cylinders 36a to 36d is lowered.

When the solenoid coils of only the normally open electromagnetic valves 42, 43, 46, 47 among the electromagnetic valves 42 to 49 are energized, all the electromagnetic valves 42 to 49 are closed. Therefore, the flow of brake fluid through the paths 33a, 33b, 34a, 34b is limited. As a result, the level of the brake fluid pressure in the wheel cylinders 36a to 36d is maintained.

With reference to FIG. 1, the ECU 16 is configured mainly by a digital computer including a CPU 60, or control unit (control section), a ROM 61, and a RAM 62 and a driver circuit (not shown) that drives various devices. The ROM 61 stores a control program for controlling operation of the fluid pressure control section 35 (actuation of the motor M, the electromagnetic valves 42 to 49, 53, 57 and the proportional electromagnetic valves 50, 54) and a map for setting minimum brake fluid pressure in the wheel cylinders 36a to 36d (see FIG. 3), which will be explained later. The RAM 62 stores various types of information (including threshold values), which is rewritten when necessary in operation of the braking force maintaining apparatus 11 of the vehicle.

The brake switch SW1, the fluid pressure sensors PS1, PS2, the accelerator opening degree sensor SE1, and the steering angle sensor SE2 are connected to an input interface (not shown) of the ECU 16. Wheel speed sensors SE3, SE4, SE5, SE6 and a lateral G sensor SE7 are also connected to the input interface of the ECU 16. The wheel speed sensors SE3, SE4, SE5, and SE6 detect the speeds of the wheels FR, FL, RR, and RL, respectively. The lateral G sensor SE7 detects actual lateral acceleration (lateral G) acting on the vehicle. Further, a yaw rate sensor SE8 and a vehicle acceleration sensor (a fore-and-rear G sensor) SE9 are connected to the input interface of the ECU 16. The yaw rate sensor SE8 detects the actual yaw rate of the vehicle. The vehicle acceleration sensor SE9 detects the acceleration of the vehicle. The CPU 60 thus receives signals from the brake switch SW1, the fluid pressure sensors PS1, PS2, and the sensors SE1 to SE9.

The motor M, which operates to actuate the pumps 38, 39, the electromagnetic valves 42 to 49, 53, 57, and the proportional electromagnetic valves 50, 54 are connected to an output interface (not shown) of the ECU 16. In correspondence with signals input by the switch SW1 and the sensors PS1, PS2, SE1 to SE9, the CPU 60 separately controls operation of the motor M, the electromagnetic valves 42 to 49, 53, 57, and the proportional electromagnetic valves 50, 54.

Figure 3:
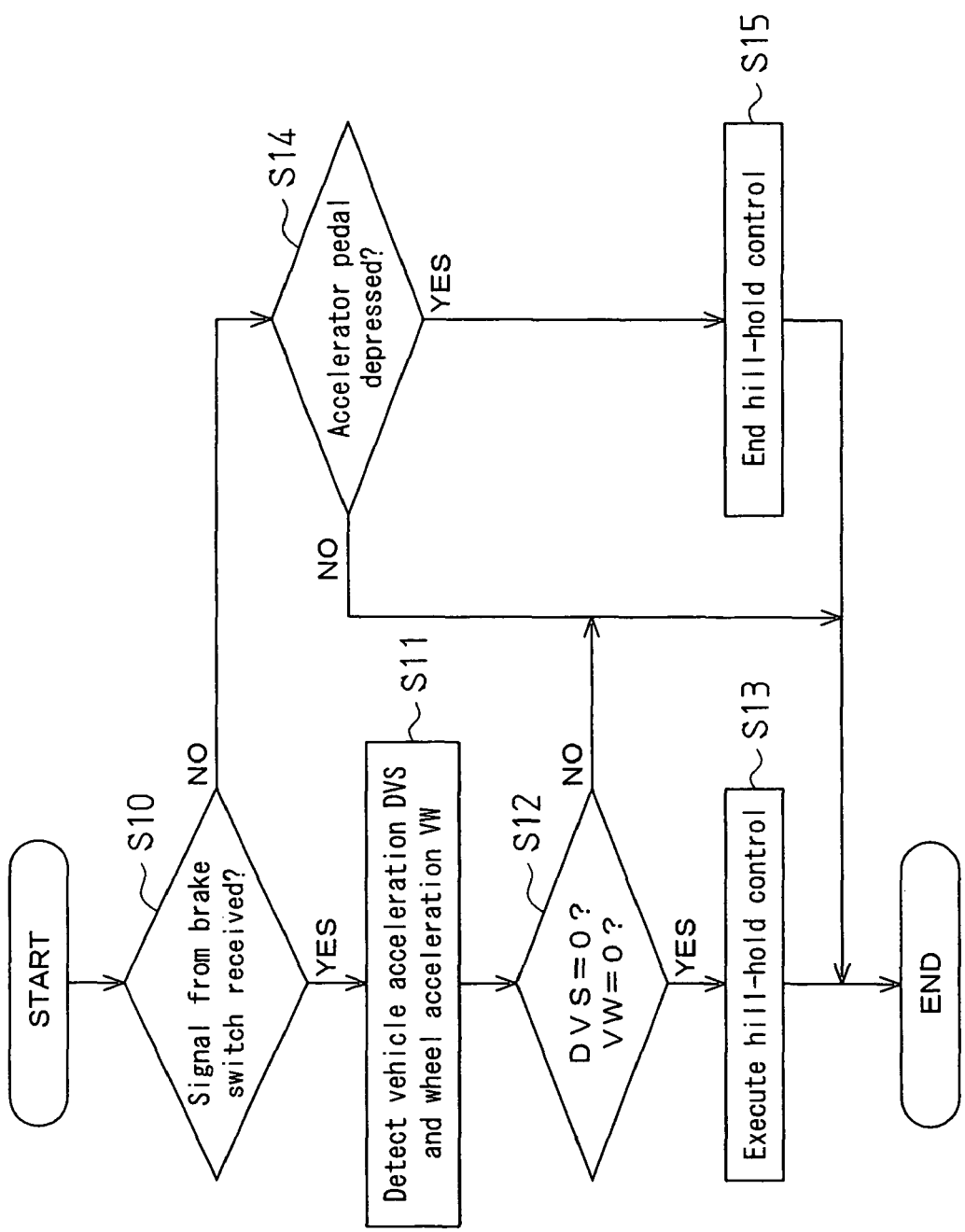
FIG. 3 is a flowchart representing the routine of a hill-hold control procedure of the first embodiment.
Figure 4:
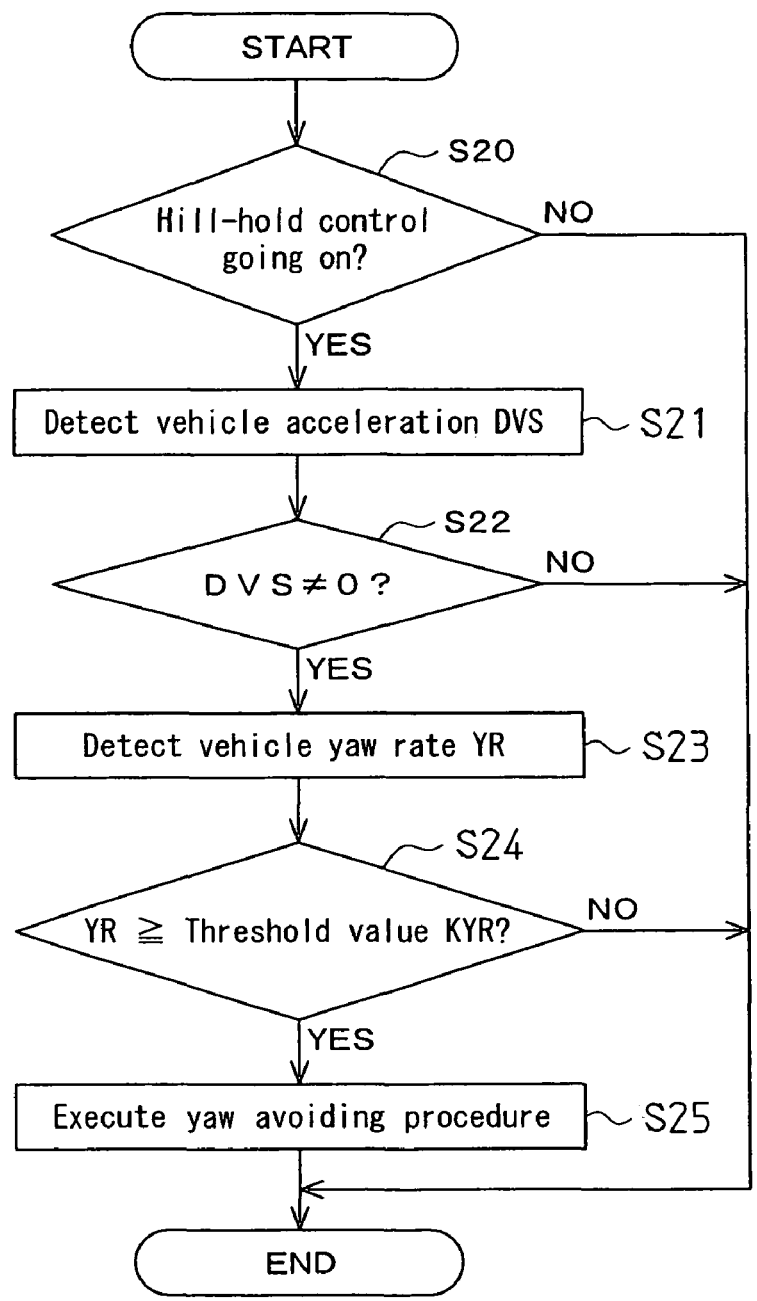
FIG. 4 is a flowchart representing the routine of a yaw avoiding procedure of the first embodiment.

The routines of the control procedures executed by the CPU 60 of the first embodiment will hereafter be explained with reference to the flowcharts of FIGS. 3 and 4. FIG. 3 is a flowchart representing the routine of a hill-hold control procedure for determining whether to execute hill-hold control, which will be described later. FIG. 4 is a flowchart representing the routine of a yaw avoiding procedure for determining whether to start yaw avoiding control, which will also be explained later.

The routine of the hill-hold control procedure will first be explained with reference to FIG. 3.

The routine of the hill-hold control procedure is repeatedly executed by the CPU 60 at predetermined intervals. In the routine, the CPU 60 determines whether a signal from the brake switch SW1 has been received (in step S10). In other words, it is determined whether the brake pedal 37 has been depressed. If determination of step S10 is negative, step S14 is carried out. If the determination of step S10 is positive, the CPU 60 detects the vehicle acceleration DVS of the vehicle in correspondence with a signal from the vehicle acceleration sensor SE9 and the wheel speed VW of each of the wheels FR, FL, RR, RL in correspondence with signals from the wheel speed sensors SE3 to SE6 (in step S11).

The CPU 60 then determines whether the vehicle acceleration DVS and the wheel speed DW of each wheel FR, FL, RR, RL from step S11 are zero (in step S12). In other words, it is determined whether the vehicle has been stopped through depression of the brake pedal 37, which applies braking force from the wheel cylinders 36a to 36d to the corresponding wheels FR, FL, RR, RL to lock the wheels FR, FL, RR, RL. In the first embodiment, the CPU 60 functions as a wheel locking determining section.

If determination of step S12 is negative, or the CPU 60 determines that the vehicle is moving (has not been stopped), and suspends the routine of the hill hold control procedure. If the determination of step S12 is positive, the CPU 60 determines that the vehicle has been stopped, and executes the hill-hold control (in step S13). Specifically, when starting such control, the CPU 60 turns on a non-illustrated hill-hold flag.

In the hill-hold control, the braking force applied to the wheels FR, FL, RR, RL by the wheel cylinders 36a to 36d through depression of the brake pedal 37 is maintained after the brake pedal 37 is released, thus holding the wheels FR, FL, RR, RL in a locked state. More specifically, in the hill-hold control, the CPU 60 energizes the normally open electromagnetic valves 42, 43, 46, 47 provided in the corresponding hydraulic circuits 33, 34. This maintains the brake fluid pressure in the wheel cylinders 36a to 36d.

The hill-hold control is carried out continuously for a predetermined time (for example, approximately two seconds) after release of the brake pedal 37. That is, the hill-hold control is automatically ended after the predetermined time has elapsed since the release of the brake pedal 37. Specifically, the normally open electromagnetic valves 42, 43, 46, 47 are de-energized and the normally closed electromagnetic valves 44, 45, 48, 49 are energized. This decreases the brake fluid pressure in each of the wheel cylinders 36a to 36d. In other words, by decreasing the braking force applied to the wheels FR, FL, RR, RL by the wheel cylinders 36a to 36d, the CPU 60 unlocks the wheels FR, FL, RR, RL. When ending the hill-hold control, the CPU 60 turns off the hill-hold flag and suspends the routine of the hill-hold control procedure.

In step S14, the CPU 60 determines whether the accelerator pedal 17 has been depressed in correspondence with a signal from the accelerator opening sensor SE1. If determination of step S14 is negative, the CPU 60 suspends the routine of the hill-hold control procedure (in step S15). If the determination of step S14 is positive, the CPU 60 determines that the driver intends to start the vehicle. In this case, the CPU 60 suspends the hill-hold control and turns off the hill-hold flag. In other words, the hill-hold control is ended in response to depression of the accelerator pedal 17 even before the predetermined time elapses after the release of the brake pedal 37. The CPU 60 then suspends the routine of the hill-hold control procedure.

Next, the routine of the yaw avoiding procedure of FIG. 4 will be explained.

The CPU 60 repeatedly performs the routine of the yaw avoiding procedure at predetermined intervals. In the routine, the CPU 60 first determines whether the hill-hold control is being carried out (in step S20). In other words, it is determined whether the hill-hold flag is "ON". If determination of step S20 is negative, the CPU 60 determines that the hill-hold control is not being carried out (the hill-hold flag="OFF"), and suspends the routine of the yaw avoiding procedure.

If the determination of step S20 is positive, the CPU 60 determines that the hill-hold control is being performed (the hill-hold control="ON"), and detects the wheel acceleration DVS in correspondence with a signal from the vehicle acceleration sensor SE9 (in step S21). The CPU 60 then determines whether the vehicle acceleration DVS from step S21 is different from zero (in step S22). In other words, it is determined whether the vehicle is moving with the wheels FR, FL, RR, RL held in a locked state by the hill-hold control (or "unintended movement" of the vehicle is happening). If the determination in step S22 is negative (DVS=0), the CPU 60 determines that the vehicle is held in a stopped state by the hill-hold control, and suspends the routine of the yaw avoiding procedure.

If the determination in step S22 is positive (DVS≠0), the CPU 60 detects the yaw rate YR of the vehicle in correspondence with a signal from the yaw rate sensor SE8 (in step S23). In this regard, the yaw rate sensor SE8 and the CPU 60 of the first embodiment function as a yaw rate detecting section. Subsequently, the CPU 60 determines whether the yaw rate YR of the vehicle, which has been detected in step S23, is greater than or equal to a threshold value KYR (in step S24). In the first embodiment, the CPU 60 thus functions also as a yaw rate determining section. The threshold value KYR is a reference value in accordance with which it is determined whether yaw of the vehicle has occurred and obtained by a test or through simulation.

If determination of step S24 is negative (YR<KYR), the CPU 60 determines that the yaw of the vehicle has not occurred or falls in an acceptable range, and suspends the routine of the yaw avoiding procedure. If the determination of step S24 is positive (YR≧KYR), the CPU determines that the yaw of the vehicle is brought about by the unintended movement of the vehicle and exceeded the acceptable range, and executes the yaw avoiding control (in step S25). In the following description, the phrase "the yaw of the vehicle has occurred" indicates that the yaw rate YR has become greater than or equal to the threshold value KYR.

By the yaw avoiding control, the braking force applied to the wheels FR, FL, RR, RL by the wheel cylinders 36a to 36d is reduced to assist correction of the posture of the vehicle, after the yaw of the vehicle has occurred in the hill-hold control. Specifically, in the yaw avoiding control, the CPU 60 de-energizes the normally open electromagnetic valves 42, 43, 46, 47 and energizes the normally closed electromagnetic valves 44, 45, 48, 49. This decreases the brake fluid pressure in the wheel cylinders 36a to 36d, unlocking the wheels FR, FL, RR, RL. The driver is thus allowed to manipulate the steering wheel 24 so as to correct the posture of the vehicle.

The CPU 60 then suspends the routine of the yaw avoiding procedure.

A method for maintaining braking force of a vehicle of the first embodiment will hereafter be described with reference to FIGS. 5 to 7.

If the vehicle is stopped in a state of moving uphill with the nose facing uphill through depression of the brake pedal 37, the hill-hold control is executed. That is, even if the brake pedal 37 is released afterward, the braking force applied to the wheels FR, FL, RR, RL by the wheel cylinders 36a to 36d is maintained constant for the predetermined time. However, if the road surface on which the vehicle is stopped has low friction coefficient p with respect to the wheels, the vehicle C may move rearward ("rolls back") in an unintended manner regardless of the hill-hold control, as illustrated in FIGS. 5A and 5B. This may cause the yaw of the vehicle C (the posture of the vehicle C may shift) under certain surface conditions of the road.

In the first embodiment, to solve this problem, if the unintended movement of the vehicle C is detected (the vehicle acceleration DVS≠0) and the detected yaw rate YR becomes greater than or equal to the threshold value KYR, the yaw avoiding procedure is carried out in combination with the hill-hold control. Specifically, in the state of FIG. 6A, the brake fluid pressure in the wheel cylinders 36a to 36d is decreased to reduce the braking force applied to the wheels FR, FL, RR, RL by the wheel cylinders 36a to 36d. Thus, in the states of FIGS. 6B and 6C, the wheels FR, FL, RR, RL are unlocked, permitting the driver to manipulate the steering wheel 24 to steer the front wheels (the steered wheels) FR, FL. The posture of the vehicle C is thus corrected by rotating the vehicle C in the direction indicated by the arrow of FIG. 6B.

In this state, the braking force applied to the wheels FR, FL, RR, RL is maintained at a decreased level. Thus, when the accelerator pedal 17 is depressed afterward, the vehicle C is started smoothly.

Similarly, if the vehicle C is stopped in a state of moving downhill with the nose facing downhill through depression of the brake pedal 37, the hill-hold control is performed. However, if the road surface on which the vehicle C is stopped has low friction coefficient μ, the vehicle C may move forward in an unintended manner and the yaw of the vehicle C may occur under certain surface conditions of the road. In this case, in the first embodiment, if the unintended movement of the vehicle C is detected (the vehicle acceleration DVS≠0) and the detected yaw rate YR becomes greater than or equal to the threshold value KYR, the yaw avoiding procedure is carried out in combination with the hill-hold control.

Specifically, in the state of FIG. 7A, the brake fluid pressure in the wheel cylinders 36a to 36d is decreased to reduce the braking force applied to the wheels FR, FL, RR, RL by the wheel cylinders 36a to 36d. Therefore, in the states of FIGS. 7B and 7C, the wheels FR, FL, RR, RL are unlocked, permitting the driver to manipulate the steering wheel 24 to :steer the front wheels (the steered wheels) FR, FL. The posture of the vehicle C is thus corrected by rotating the vehicle C in the direction indicated by the arrow of FIG. 7B.

The first embodiment has the following advantages.

(1) If the yaw rate YR of the vehicle C becomes greater than or equal to the threshold value KYR while the hill-hold control is being performed, which is executed after the vehicle C has been stopped by applying braking force to the wheels FR, FL, RR, RL, it is determined that yaw of the vehicle C has occurred. In this case, the wheel cylinders (the braking device) 36a to 36d are controlled to reduce the braking force acting on the wheels FR, FL, RR, RL including the outer steered wheel (the left front wheel FL in FIG. 6A or the right front wheel FR in FIG. 7A). This permits manipulation of the steering wheel 24 for correcting the posture of the vehicle C. In other words, if the yaw of the vehicle C is caused by the unintended movement of the vehicle C with the wheels FR, FL, RR, RL held in a locked state by the hill-hold control, correction of the posture of the vehicle C is assisted. The "outer steered wheel" refers to the one of the steered wheels FR, FL that corresponds to the outer wheel when the steered wheels FR, FL are steered through manipulation of the steering wheel 24 intended to correct the posture of the vehicle C.

(2) In the case of the unintended movement of the vehicle C with the wheels FR, FL, RR, RL maintained in a locked state, the braking force applied to the wheels FR, FL, RR, RL by the wheel cylinders 36a to 36d is decreased altogether. The wheels FR, FL, RR, RL are thus unlocked, permitting the driver to manipulate the steering wheel 24. The posture of the vehicle C is thus easily corrected.

Figure 8:
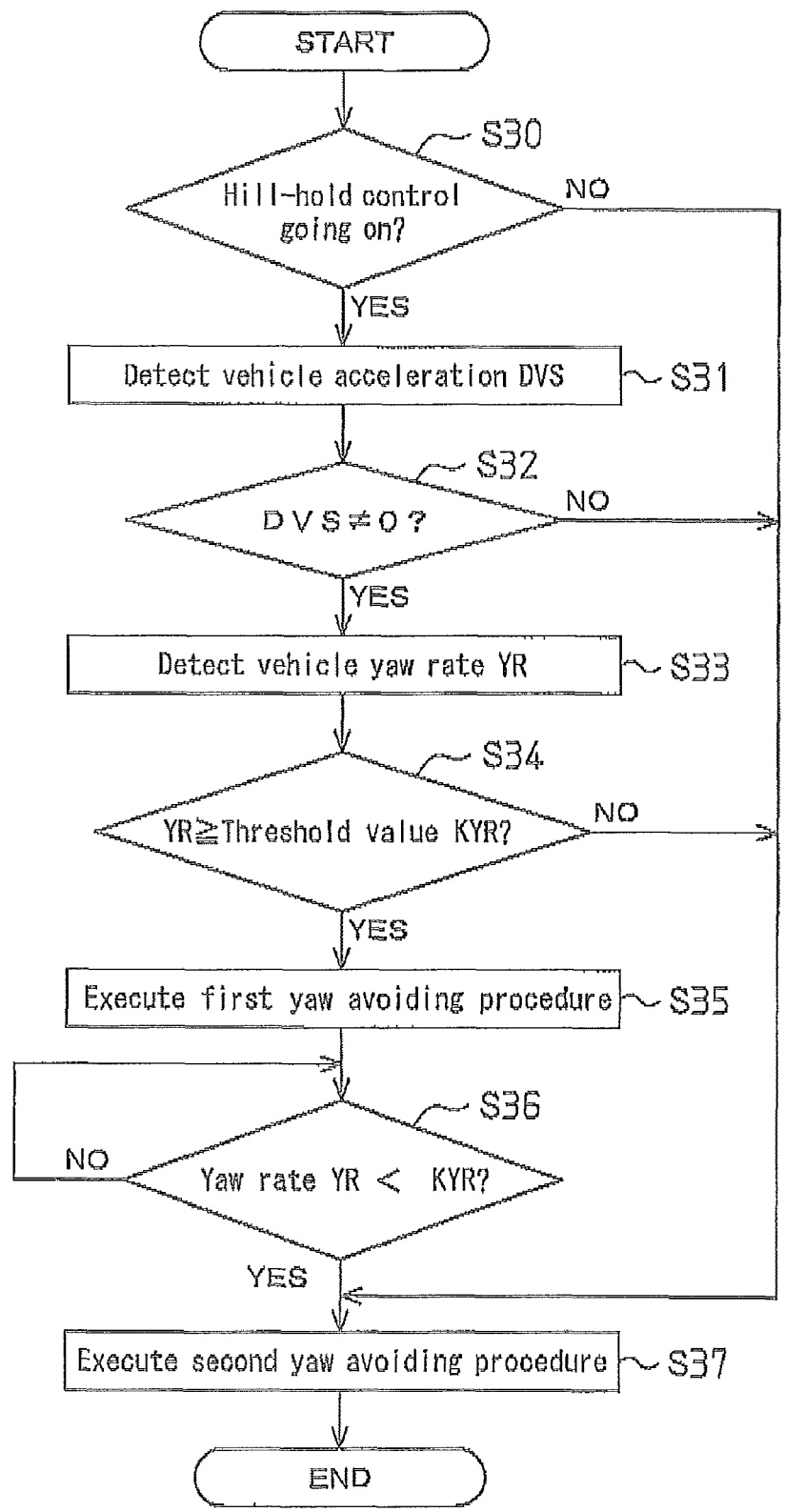
FIG. 8 is a flowchart representing the routine of a yaw avoiding procedure according to a second embodiment of the present invention.

A second embodiment of the present invention will now be described with reference to FIGS. 8 to 10. In the second embodiment, the yaw avoiding procedure is carried out in accordance with a different routine from that of the first embodiment. The following description thus focuses on the differences between the second and first embodiments. Same or like reference numerals are given to parts of the second embodiment that are the same as or like corresponding parts of the first embodiment.

The braking force maintaining apparatus 11 of the second embodiment has the electronic control unit 16. The electronic control unit 16 mainly includes the digital computer having the CPU 60, the ROM 61, and the RAM 62 and the driver circuit (not shown) that drives various devices. The ROM 61 stores control programs for controlling operation of the fluid pressure control section 35 (actuation of the motor M, the electromagnetic valves 42 to 49, 53, 57, and the proportional electromagnetic valves 50, 54) and threshold values. The RAM 62 stores different types of information that is rewritten as needed in operation of the braking force maintaining apparatus 11.

Next, the routine of the yaw avoiding procedure executed by the CPU 60 of the second embodiment will be explained with reference to FIG. 8.

The CPU 60 repeatedly performs the routine of the yaw avoiding procedure at predetermined intervals. In the routine, the CPU 60 determines whether the hill-hold control is being carried out (in step S30). If determination of step S30 is negative, the CPU 60 determines that the hill-hold control is not being carried out, and suspends the routine of the yaw avoiding procedure. If the determination of step S30 is positive, the CPU 60 determines that the hill-hold control is being performed, and detects the vehicle acceleration DVS in correspondence with a signal from the vehicle acceleration sensor SE9 (in step S31).

The CPU 60 then determines whether the vehicle acceleration DVS from step S31 is different from zero (in step S32). If the determination in step S22 is negative (DVS=0), the CPU 60 suspends the routine of the yaw avoiding procedure. If the determination in step S32 is positive (DVS≠0), the CPU 60 detects the yaw rate YR of the vehicle in correspondence with a signal from the yaw rate sensor SE8 (in step S33). Subsequently, the CPU 60 determines whether the yaw rate YR of the vehicle, which has been detected in step S33, is greater than or equal to the threshold value KYR (in step S34).

If determination of step S34 is negative (YR<KYR), the CPU 60 suspends the routine of the yaw avoiding routine. If the determination of step S34 is positive (YR≧KYR), the CPU 60 executes a first yaw avoiding procedure (in step S35). Specifically, the CPU 60 energizes the normally open electromagnetic valves 42, 46 and the normally closed electromagnetic valves 44, 48 to decrease the brake fluid pressure in the wheel cylinders 36a, 36b corresponding to the front wheels FR, FL, or the steered wheels.

Subsequently, the CPU 60 detects the yaw rate YR of the vehicle in correspondence with a signal from the yaw rate sensor SE8 and determines whether the yaw rate YR is less than the threshold value KYR (in step S36). If determination of step S36 is negative (YR≧KYR), the CPU 60 repeatedly carries out step S36 until the determination becomes positive. If the determination of step S36 is positive (YR<KYR), the CPU 60 determines that the posture of the vehicle C has been corrected, and executes a second yaw avoiding procedure (in step S37). Specifically, the CPU 60 energizes the normally open electromagnetic valves 43, 47 and the normally closed electromagnetic valves 45, 49 to decrease the brake fluid pressure in the wheel cylinders 36c, 36d corresponding to the rear wheels RR, RL, or the non-steered wheels. The CPU 60 then suspends the routine of the yaw avoiding procedure.

A method for maintaining braking force of a vehicle of the second embodiment will hereafter be explained with reference to FIGS. 9 and 10.

If the vehicle C is stopped in a state of moving uphill with the nose facing uphill through depression of the brake pedal 37, the hill-hold control is performed. However, if the road surface on which the vehicle C is stopped has low friction coefficient μ, the vehicle C may move rearward in an unintended manner and the yaw of the vehicle C may occur (the posture of the vehicle C may change) under certain surface conditions of the road. In this case, in the second embodiment, if the unintended movement of the vehicle C is detected (the vehicle acceleration DVS≠0) and the detected yaw rate YR becomes greater than or equal to the threshold value KYR, the first yaw avoiding procedure is carried out in combination with the hill-hold control.

Specifically, in the state of FIG. 9A, the brake fluid pressure in the wheel cylinders 36a, 36b corresponding to the front wheels FR, FL, or the steered wheels, is decreased to reduce the braking force applied to the wheels FR, FL by the wheel cylinders 36a, 36b. Therefore, in the states of FIGS. 9B and 9C, the wheels FR, FL are unlocked, permitting the driver to manipulate the steering wheel 24 to steer the front wheels FR, FL. The posture of the vehicle C is thus corrected by rotating the vehicle C in the direction indicated by the arrow of FIG. 9B.

Subsequently, when the yaw rate YR of the vehicle becomes smaller than the threshold value KYR, indicating that the posture of the vehicle C has been corrected, the second yaw avoiding procedure is carried out. Specifically, in the state of FIG. 9D, the brake fluid pressure in the wheel cylinders 36c, 36d corresponding to the rear wheels RR, RL, or the non-steered wheels, is decreased to reduce the braking force applied to the wheels RR, RL by the wheel cylinders 36c, 36d, unlocking the wheels RR, RL.

Similarly, if the vehicle C is stopped in a state of moving downhill with the nose facing downhill through depression of the brake pedal 37, the hill-hold control is performed. However, if the road surface on which the vehicle C is stopped has low friction coefficient μ, the vehicle C may move forward in an unintended manner and the yaw of the vehicle C may occur under certain surface conditions of the road. In this case, in the second embodiment, if the unintended movement of the vehicle C is detected (the vehicle acceleration DVS≠0) and the detected yaw rate YR becomes greater than or equal to the threshold value KYR, the first yaw avoiding procedure is carried out in combination with the hill-hold control.

Specifically, in the state of FIG. 10A, the brake fluid pressure in the wheel cylinders 36a, 36b corresponding to the front wheels FR, FL, or the steered wheels, is decreased to reduce the braking force applied to the wheels FR, FL by the wheel cylinders 36a, 36b. Thus, in the states of FIGS. 10B and 10C, the wheels FR, FL are unlocked, permitting the driver to manipulate the steering wheel 24 to steer the front wheels FR, FL. The posture of the vehicle C is thus corrected by rotating the vehicle C in the direction indicated by the arrow of FIG. 10B.

Subsequently, when the yaw rate YR of the vehicle becomes smaller than the threshold value KYR, indicating that the posture of the vehicle C has been corrected, the second yaw avoiding procedure is carried out. Specifically, in the state of FIG. 10D, the brake fluid pressure in the wheel cylinders 36c, 36d corresponding to the rear wheels RR, RL, or the non-steered wheels, is decreased to reduce the braking force applied to the rear wheels RR, RL by the wheel cylinders 36c, 36d, unlocking the wheels RR, RL.

The second embodiment has the following advantages in addition to the advantage equivalent to the item (1) of the first embodiment.

(3) If the unintended movement of the vehicle C occurs with the wheels FR, FL, RR, RL held in a locked state, only the braking force of the front wheels FR, FL (the steered wheels) is decreased. This permits the driver to maintain the braking force acting on the vehicle C and correct the posture of the vehicle C.

(4) After correction of the posture of the vehicle C, the braking force applied to the wheels FR, FL, RR, RL by the wheel cylinders (the braking device) 36a to 36d is maintained at a decreased level. This enables smooth starting of the vehicle C.

A third embodiment of the present invention will now be described with reference to FIGS. 11 to 12. In the third embodiment, first and second yaw avoiding procedures of the routine of a yaw avoiding procedure are carried out differently from those of the second embodiment. The following description thus focuses on the differences between the third and second embodiments. Same or like reference numerals are given to parts of the third embodiment that are the same as or like corresponding parts of the second embodiment.

The braking force maintaining apparatus 11 of the third embodiment has the electronic control unit 16. The electronic control unit 16 mainly includes the digital computer having the CPU 60, the ROM 61, and the RAM 62 and the driver circuit (not shown) that drives various devices. The ROM 61 stores control programs for controlling operation of the fluid pressure control section 35 (actuation of the motor M, the electromagnetic valves 42 to 49, 53, 57, and the proportional electromagnetic valves 50, 54) and threshold values. The RAM 62 stores different types of information that is rewritten as needed in operation of the braking force maintaining apparatus 11.

The CPU 60 repeatedly executes the routine of the yaw avoiding procedure at predetermined intervals. In the routine, if the CPU 60 determines that the yaw of the vehicle C has been brought about by the unintended movement of the vehicle C (the yaw rate YR of the vehicle C has become greater than or equal to the threshold value KYR) in the hill-hold control, the first yaw avoiding procedure is carried out. Specifically, the CPU 60 identifies the direction in which the posture of the vehicle C has become offset in correspondence with the yaw rate YR detected using a signal from the yaw rate sensor SE8. In other words, the CPU 60 determines which side of the wheels, the right wheels FR, RR or the left wheels FL, RL, correspond to the outer wheels. The "outer wheels" refer to the wheels that are located at the outer side when the steered wheels FR, FL are steered through manipulation of the steering wheel 24 intended to correct the posture of the vehicle C.

The CPU 60 then energizes the normally open electromagnetic valves (for example, the electromagnetic valves 42, 47) and the normally closed electromagnetic valves (for example, the electromagnetic valves 44, 49) to decrease the brake fluid pressure in the wheel cylinders (for example, the wheel cylinders 36a, 36c) corresponding to the determined outer wheels (for example, the right wheels FR, RR).

Further, when it is determined that the yaw rate YR of the vehicle has become smaller than the threshold value KYR after starting of the first yaw avoiding procedure, the CPU 60 performs the second yaw avoiding procedure. Specifically, the CPU 60 energizes the normally open electromagnetic valves (for example, the electromagnetic valves 43, 46) and the normally closed electromagnetic valves (for example, the electromagnetic valves 45, 48) to decrease the brake fluid pressure in the wheel cylinders (for example, the wheel cylinders 36b, 36d) corresponding to the inner wheels (for example, the left wheels FL, RL).

A method for maintaining braking force of a vehicle of the third embodiment will hereafter be explained with reference to FIGS. 11 and 12.

If the vehicle C is stopped in a state of moving uphill with the nose facing uphill through depression of the brake pedal 37, the hill-hold control is performed. However, if the road surface on which the vehicle C is stopped has low friction coefficient μ, the vehicle C may move rearward in an unintended manner and the yaw of the vehicle C may occur (the posture of the vehicle C may shift rightward) under certain surface conditions of the road. In this case, in the third embodiment, if the unintended movement of the vehicle C is detected (the vehicle acceleration DVS≠0) and the detected yaw rate YR becomes greater than or equal to the threshold value KYR, the first yaw avoiding procedure is carried out in combination with the hill-hold control.

Figure 11A:
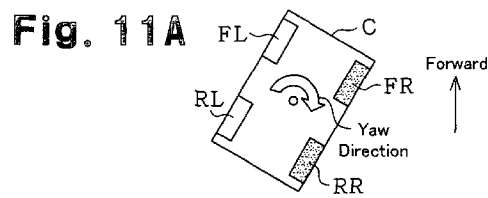
FIG. 11A is a diagrammatic view showing a state of the vehicle in a first yaw avoiding procedure according to a third embodiment of the present invention executed following rearward movement of the vehicle.
Figure 11B:
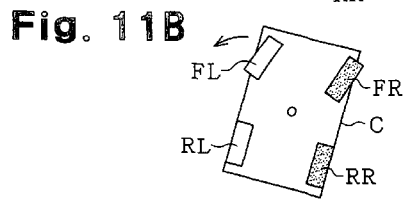
FIG. 11B is a diagrammatic view showing a state of the vehicle where the front wheels are steered.
Figure 11C:
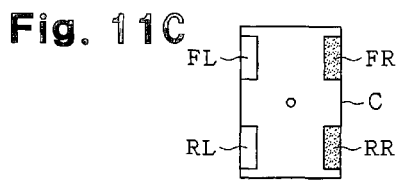
FIG. 11C is a diagrammatic view showing a state of the vehicle after the posture of the vehicle has been corrected.
Figure 11D:
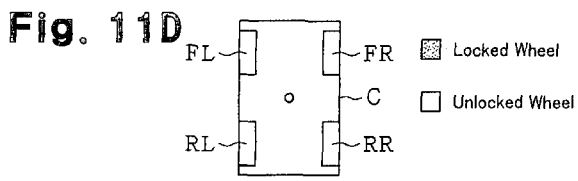
FIG. 11D is a diagrammatic view showing a state of the vehicle in a second yaw avoiding procedure.

Specifically, in the state of FIG. 11A, the brake fluid pressure in the wheel cylinders 36b, 36d corresponding to the left wheels FL, RL is decreased to reduce the braking force applied to the wheels FL, RL by the wheel cylinders 36b, 36d.

The left wheels FL, RL correspond to the outer wheels when the steered wheels FR, FL are steered through manipulation of the steering wheel 24 intended to correct the posture of the vehicle C. Therefore, in the states of FIGS. 11B and 11C, the left front wheel FL is unlocked, permitting the driver to manipulate the steering wheel 24 to steer the left front wheel FL. The posture of the vehicle C is thus corrected by rotating the vehicle C in the direction indicated by the arrow of FIG. 11B.

Subsequently, when the yaw rate YR of the vehicle becomes smaller than the threshold value KYR, indicating that the posture of the vehicle C has been corrected, the second yaw avoiding procedure is carried out. Specifically, the braking force applied to the right wheels FR, RR by the wheel cylinders 36a, 36c has been maintained constant since the start of the hill-hold control (throughout the hill-hold control). In the state of FIG. 1D, the brake fluid pressure in the wheel cylinders 36a, 36c corresponding to the right wheels FR, RR is decreased. This reduces the braking force applied to the right wheels FR, RR by the wheel cylinders 36a, 36c, unlocking the wheels FR, RR.

If the vehicle C is stopped in a state of moving downhill with the nose facing downhill through depression of the brake pedal 37, the hill-hold control is performed. However, if the road surface on which the vehicle C is stopped has low friction coefficient μ, the vehicle C may move forward in an unintended manner and the yaw of the vehicle C may occur (the posture of the vehicle C may shift rightward) under certain surface conditions of the road. In this case, in the third embodiment, if the unintended movement of the vehicle C is detected (the vehicle acceleration DVS≠0) and the detected yaw rate YR becomes greater than or equal to the threshold value KYR, the first yaw avoiding procedure is carried out in combination with the hill-hold control.

Figure 12A:
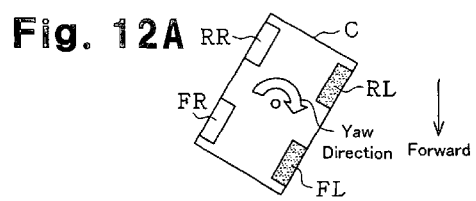
FIG. 12A is a diagrammatic view showing a state of the vehicle in the first yaw avoiding procedure of the third embodiment executed following forward movement of the vehicle.
Figure 12B:
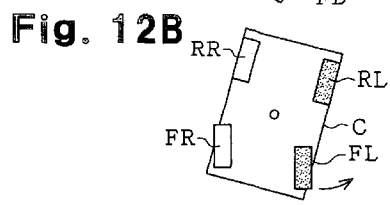
FIG. 12B is a diagrammatic view showing a state of the vehicle where the front wheels are steered.
Figure 12C:
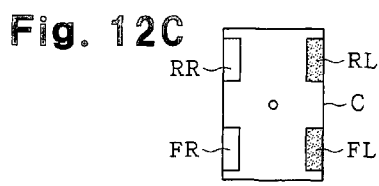
FIG. 12C is a diagrammatic view showing a state of the vehicle after the posture of the vehicle has been corrected.

Specifically, in the state of FIG. 12A, the brake fluid pressure in the wheel cylinders 36a, 36c corresponding to the right wheels FR, RR is decreased. This reduces the braking force applied to the right wheels FR, RR by the wheel cylinders 36a, 36c. The right wheels FR, RR correspond to the outer wheels when the steered wheels FR, FL are steered through manipulation of the steering wheel 24 intended to correct the posture of the vehicle C. Therefore, in the states of FIGS. 12B and 12C, the right front wheel FR, or the steered wheel, is unlocked, permitting the driver to manipulate the steering wheel 24 to steer the right front wheel FR. The posture of the vehicle C is thus, corrected by rotating the vehicle C in the direction indicated by the arrow of FIG. 12B.

Figure 12D:
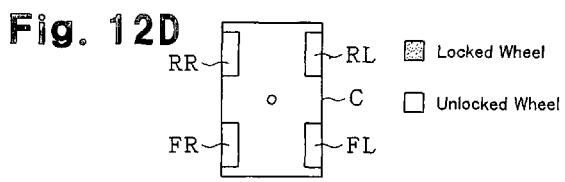
FIG. 12D is a diagrammatic view showing a state of the vehicle in the second yaw avoiding procedure.

Subsequently, when the yaw rate YR of the vehicle becomes smaller than the threshold value KYR, indicating that the posture of the vehicle C has been corrected, the second yaw avoiding procedure is carried out. Specifically, the braking force applied to the left wheels FL, RL by the wheel cylinders 36b, 36d has been maintained constant since the start of the hill-hold control (throughout the hill-hold control). In the state of FIG. 12D, the brake fluid pressure in the wheel cylinders 36b, 36d corresponding to the left wheels FL, RL is decreased. This reduces the braking force applied to the left wheels FL, RL by the wheel cylinders 36b, 36d, unlocking the wheels FL, RL.

The third embodiment has the following advantage in addition to the advantages equivalent to the items (1) and (4) of the first and second embodiments.

(5) If the unintended movement of the vehicle C happens with the wheels FR, FL, RR, RL held in a locked state, decrease of the braking force occurs only in the wheels (for example, the right wheels FR, RR) corresponding to the outer wheels in manipulation of the steering wheel 24 intended to correct the posture of the vehicle C, by which the steered wheels are steered. This permits the driver to correct the posture of the vehicle C while maintaining the braking force of the vehicle C.

The present invention may be embodied as the following embodiments (the following modified examples).

In the second and third embodiments, the second yaw avoiding procedure does not necessarily have to be performed.

In each of the illustrated embodiments, the yaw rate YR of the vehicle may be calculated from the vehicle acceleration DVS detected in correspondence with a signal of the vehicle accelerator sensor SE9, the steering angle of the steering wheel 24 detected in correspondence with a signal of the steering angle sensor SE2, and the lateral G (the lateral acceleration) detected in correspondence with a signal from the lateral G sensor SE7. In this case, the yaw rate detecting section is configured by the vehicle acceleration sensor SE9, the steering angle sensor SE2, the lateral G sensor SE7, and the CPU 60.

In each of the illustrated embodiments, the brake pedal 37 does not necessarily have to be a foot pedal type depressed by the driver but may be a manually operable brake pedal, which is operated by hand.

In each of the illustrated embodiments, the braking force maintaining apparatus 11 for a vehicle may include a radar (for example, a forward-looking radar or a close-range radar) that detects the interval (the distance) between an object (for example, a different vehicle) in front of the vehicle and the vehicle. In this case, if the radar detects that the aforementioned interval has changed (for example, increased), the CPU 60 determines that the unintended movement of the vehicle has occurred.

In each of the illustrated embodiments, the present invention is applied to the braking force maintaining apparatus 11 of a front-wheel-drive vehicle. However, the braking force maintaining apparatus of the invention may be used in a rear-wheel-drive vehicle or in a four-wheel-drive vehicle.

In each of the illustrated embodiments, the wheel cylinder 36a for the right front wheel FR and the wheel cylinder 36b for the left front wheel FL may be connected to the first hydraulic circuit 33. In this case, the wheel cylinder 36c for the right rear wheel RR and the wheel cylinder 36d for the left rear wheel RL are connected to the second hydraulic circuit 34.

The invention claimed is:

1. A braking force maintaining apparatus of a vehicle, the vehicle including a braking device that applies a braking force to each of a plurality of wheels of the vehicle through depression of a brake pedal, the wheels including a left steered wheel and a right steered wheel that are steered through manipulation of a steering wheel, the apparatus executing hill-hold control in which the braking force acting on each wheel of the vehicle in a stopped state through the depression of the brake pedal is maintained by the braking device even after release of the brake pedal, the apparatus comprising:
    a yaw rate detecting device that detects a yaw rate of the vehicle;
    a yaw rate determining section that determines whether the yaw rate detected by the yaw rate detecting device is greater than or equal to a predetermined threshold value;
    a wheel lock determining section that determines whether the wheels are held in a locked state by the braking force applied by the braking device; and
    a control section that controls the braking device in such a manner that, if determination of the wheel lock determining section is positive and determination of the yaw rate determining section is positive, the braking force acting on first wheels, which are some of the plurality of wheels including at least a specific wheel, falls below the braking force at a start of the hill-hold control, the specific wheel being one of the steered wheels that corresponds to an outer wheel when the steered wheels are steered through the manipulation of the steering wheel intended to correct an offset posture of the vehicle that causes generation of the yaw rate, and wherein, if the determination of the yaw rate determining section switches from positive to negative, the control section controls the braking device in such a manner as to decrease the braking force acting on second wheels, which are wheels other than the first wheels, so that the braking force acting on all the plurality of wheels falls below the braking force at the start of the hill-hold control.

2. The apparatus according to claim 1, wherein the wheels include left and right non-steered wheels, the first wheels are the steered wheels and the second wheels are the non-steered wheels, wherein, if the determination of the wheel lock determining section is positive and the determination of the yaw rate determining section is positive, the control section controls the braking device in such a manner that the braking force acting on each of all the steered wheels falls below the braking force at the start of the hill-hold control.

3. A method for maintaining a braking force of a vehicle, the method comprising:
    applying a braking force to each of a plurality of wheels of the vehicle by a braking device through depression of a brake pedal, the wheels including a left steered wheel and a right steered wheel that are steered through manipulation of a steering wheel;
    executing hill-hold control in which the braking force acting on each of the wheels of the vehicle held in a stopped state through the depression of the brake pedal is maintained by the braking device even after release of the brake pedal;
    detecting a yaw rate of the vehicle;
    determining whether the detected yaw rate is greater than or equal to a predetermined threshold value;
    determining whether the wheels are held in a locked state by the braking force applied by the braking device; and
    controlling the braking device in such a manner that, if the wheels are held in the locked state and the detected yaw rate is greater than or equal to the threshold value, the braking force acting on first wheels, which are some of the plurality of wheels including at least a specific wheel, falls below the braking force at a start of the hill-hold control, the specific wheel being one of the steered wheels that corresponds to an outer wheel when the steered wheels are steered through the manipulation of the steering wheel intended to correct an offset posture of the vehicle that causes generation of the yaw rate; and
    controlling, if the detected yaw rate falls below the threshold value from a value equal to or greater than the threshold value, the braking device to decrease the braking force acting on second wheels, which are wheels other than the first wheels, so that the braking force acting on all the plurality of wheels falls below the braking force at the start of the hill-hold control.

4. The method according to claim 3, wherein the wheels further includes left and right non-steered wheels, the first wheels are the steered wheels and the second wheels are the non-steered wheels, wherein the controlling the braking device in such a manner that the braking force acting on the first wheels falls below the braking force at the start of the hill-hold control includes controlling the braking device in such a manner that the braking force acting on each of all the steered wheels falls below the braking force at the start of the hill-hold control.

5. A braking force maintaining apparatus of a vehicle, the vehicle including a braking device that applies a braking force to each of a plurality of wheels of the vehicle through depression of a brake pedal, the wheels including a left steered wheel and a right steered wheel that are steered through manipulation of a steering wheel, the left steered wheel and the right steered wheel together constituting first wheels, the plurality of wheels also including second wheels different from the first wheels, the apparatus executing hill-hold control in which the braking force acting on each of the plurality of wheels of the vehicle in a stopped state through the depression of the brake pedal is maintained by the braking device even after release of the brake pedal to lock each of the plurality of wheels, the apparatus comprising:
- a yaw rate detecting device that detects a yaw rate of the vehicle;
- a yaw rate determining section that determines whether the yaw rate detected by the yaw rate detecting device is greater than or equal to a predetermined threshold value;
- a wheel lock determining section that determines whether the wheels are being held in a locked state by the braking force applied by the braking device; and
- a control section that controls the braking device so that, if the wheel lock determining section determines that the plurality of wheels are being held in the locked state and the yaw rate determining section determines that the yaw rate detected by the yaw rate detecting device is greater than or equal to a predetermined threshold value, the braking force acting on less than all of the plurality of wheels, including at least a specific wheel, falls below the braking force at the start of the hill-hold control, the specific wheel being one of the steered wheels that corresponds to an outer wheel when the steered wheels are steered through manipulation of the steering wheel intended to correct an offset posture of the vehicle that causes generation of the yaw rate; and wherein, if the detected yaw rate falls below the threshold value from a value equal to or greater than the threshold value, the control section controls the braking device in such a manner as to decrease the braking force acting on the wheels the braking force applied to which by the braking device has been held in an unchanged state since the start of the hill-hold control.

6. The apparatus according to claim 5, wherein said less than all of the plurality of wheels includes the first wheels.

7. The apparatus according to claim 5, wherein said less than all of the plurality of wheels excludes the second wheels.

8. The apparatus according to claim 5, wherein the control section controls the braking device so that if, following the braking force acting on less than all of the plurality of wheels falling below the braking force at the start of the hill-hold control, the yaw rate determining section determines that the yaw rate detected by the yaw rate detecting device is no longer greater than or equal to a predetermined threshold value, the braking device decreases the braking force acting on second wheels, which are wheels different from the first wheels, so that the braking force acting on all the plurality of wheels falls below the braking force at the start of the hill-hold control.

* * * * *